W. G. HAWLEY.
FRICTION CLUTCH.
APPLICATION FILED FEB. 6, 1919.

1,398,554.

Patented Nov. 29, 1921.
2 SHEETS—SHEET 1.

INVENTOR
William G. Hawley
BY
ATTORNEYS

W. G. HAWLEY.
FRICTION CLUTCH.
APPLICATION FILED FEB. 6, 1919.

1,398,554.

Patented Nov. 29, 1921.
2 SHEETS—SHEET 2.

INVENTOR
William G. Hawley
BY
ATTORNEYS

UNITED STATES PATENT OFFICE.

WILLIAM G. HAWLEY, OF ELMIRA, NEW YORK, ASSIGNOR TO AMERICAN LA FRANCE FIRE ENGINE COMPANY, INC., OF ELMIRA, NEW YORK, A CORPORATION OF NEW YORK.

FRICTION-CLUTCH.

1,398,554.      Specification of Letters Patent.      Patented Nov. 29, 1921.

Application filed February 6, 1919. Serial No. 275,427.

*To all whom it may concern:*

Be it known that I, WILLIAM G. HAWLEY, a citizen of the United States, residing at Elmira, in the county of Chemung and State of New York, have invented certain new and useful Improvements in Friction-Clutches, of which the following is a specification.

This invention relates to friction clutches of the general type shown and described in Patent Number 1,294,800 granted in my name on the 18th day of February, 1919. The object of the present invention is to provide an improved construction for a friction clutch of this character for equalizing the distribution of pressure exerted between an abutment and a clutch "pack" through the intermedium of rocker cams or other interposed instrumentalities which in the present instance are operated by a slidable sleeve on the driven shaft. Specific objects of invention will appear in the specification and be pointed out in the claim, reference being had to the accompanying drawings which exemplify my invention in a preferred embodiment.

In Patent Number 1,294,800, granted in my name on the 18th day of February, 1919, is shown a friction clutch in which the fulcrum plate is held at a fixed angle to the common axis of the driving and driven members of said clutch. It has been found in the use of the clutch disclosed in the above patent that irregularities in the fabric of the clutch plates or any irregularities in the machining of said plates or in the machining of the rocker cam levers, may affect in considerable degree the distribution of pressure transmitted to the clutch "pack" by means of the rocker cam levers. In order to overcome these objections and to render the action of the clutch more effective without necessitating an extreme degree of nicety in the finish of constructional details, the present invention contemplates suitable and efficient means for providing a floating abutment which will be adapted to equalize the pressures transmitted by rocker cams or their equivalent from the pressure exerting means to the clutch "pack". Another object of invention resides in certain details of construction which produce a more effective support for the operating parts.

Figure 1:
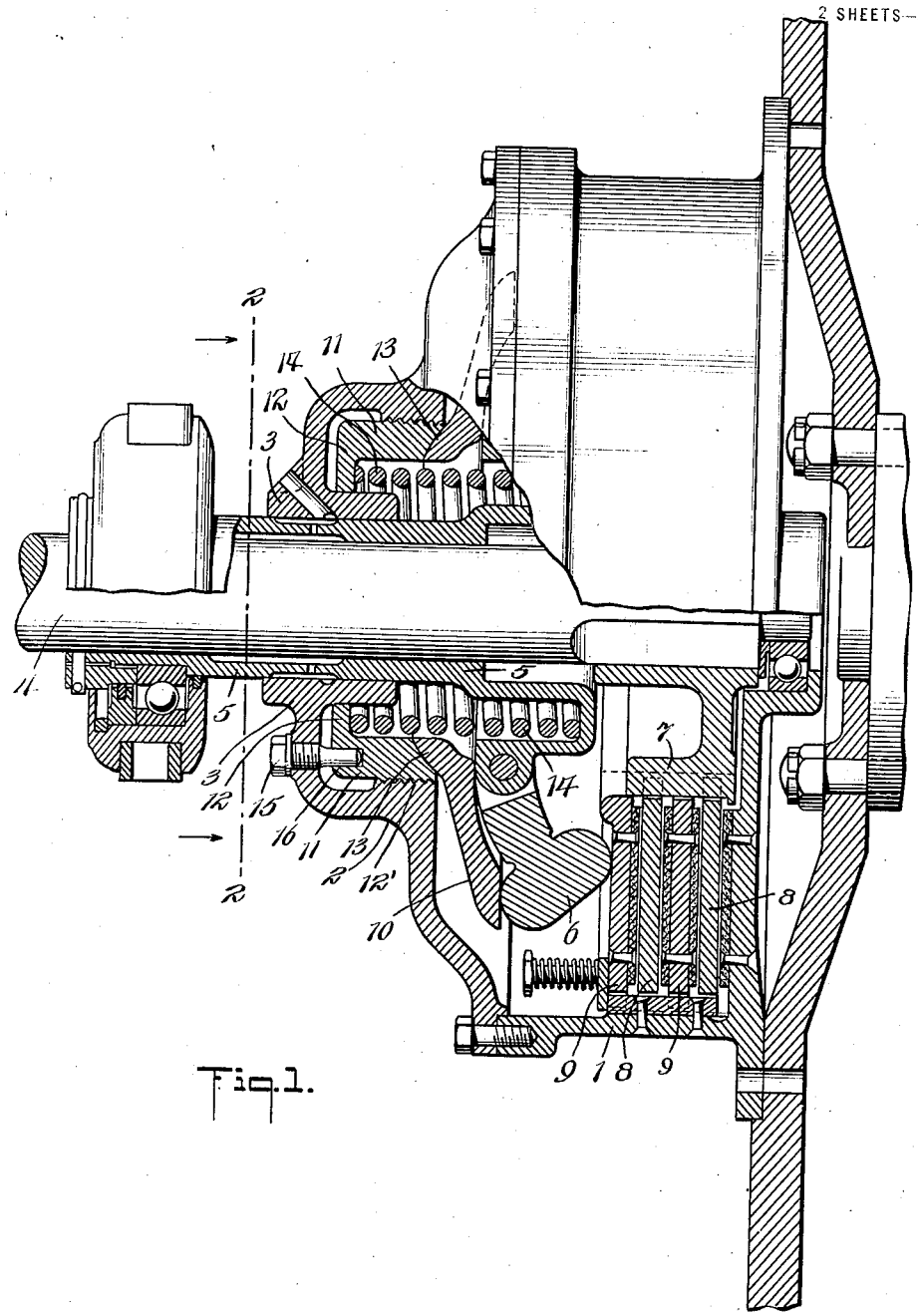
Figure 1 is an axial section of a friction clutch constructed in accordance with the principles of the present invention, parts being shown in elevation and parts broken away.
Figure 2:
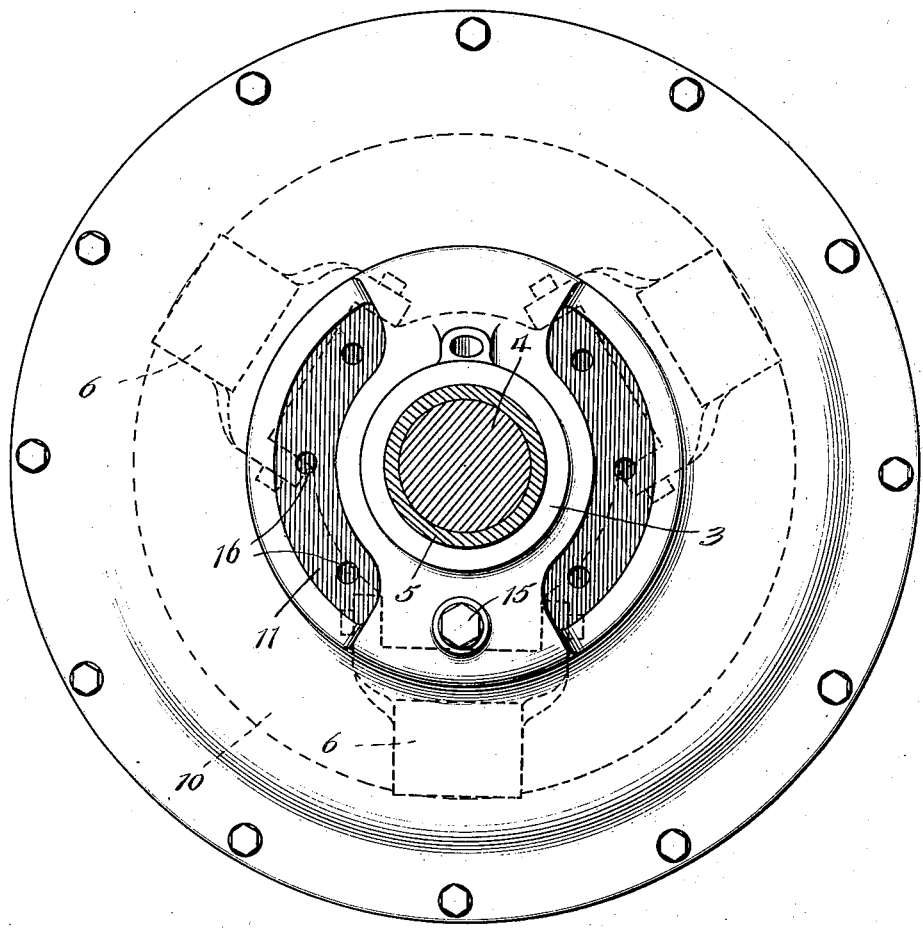
Fig. 2 is a section on the line 2—2, Fig. 1.

According to the embodiment of my invention shown on the drawings, the driving member includes a clutch housing comprising a cylindrical shell 1 and a cover 2 which is provided with a centrally disposed bearing 3. The driven member in the present instance is a shaft 4. Upon this shaft and between said shaft and bearing 3, is reciprocably mounted a sleeve 5 upon which is pivoted a plurality of rocking cam levers 6. Keyed to the shaft 4 is a clutch head 7 upon which the clutch elements 8 are axially movable but non-rotatably mounted. Said clutch elements 8 are arranged alternately with respect to other clutch elements 9 which are movable axially but are non-rotatable with respect to the cylindrical shell 1 in which they are mounted. Clutch elements 8 and 9 constitute a clutch "pack" between which and a floating abutment 10 the rocker cams 6 are operatable for applying and releasing the clutch. An adjusting ring 11 is provided with an inwardly presented flange 12 which slidably engages one end of the hub 3 which is extended axially for that purpose. By an inspection of Fig. 1, it will be seen that the cover 2 is provided with an inwardly presented cylindrical boss to which the adjusting ring 11 is connected by screw threads 12. At its inner end, the adjusting ring is articulately connected to the floating abutment 10 by means of matched bearing surfaces 13, said surfaces preferably corresponding to a surface of revolution such as that produced by a generatrix 13 revolving about the axis of shaft 4. A compression spring 14 which is interposed between the sleeve 5 and the flange 12 of adjusting ring 11, serves to apply the clutching pressure whenever said sleeve is released for this action. The tension in spring 14 is regulated by rotating the adjusting ring 11 in the threaded boss 12 which serves to impart an axial movement to said ring in one direction or the other. In order to restrain the adjusting ring from axial displacement after it has been adjusted to a given position, one or more locking screws 15 may be threaded into the cover 2 and provided with nibs 16 on their inner ends which fit into corresponding sockets 16 formed in the ring 11 as shown in Fig. 1. For imparting the rotary adjustment movements to said ring, a spanner wrench may be employed with pins engaging in said sockets 16.

It will be understood from the foregoing description that during the operation of the rocker cams 6, the floating abutment 10 remains free to adjust its position angularly in the annular seat or bearing 13, thus providing an equalization in the distribution of pressure with respect to the rocker cams 6. By means of this construction, all irregularities in the material of which the clutch elements are composed, as well as any slight irregularities in the machining of clutch elements or rocker cams, are compensated in such a way that the spring pressure acting through the rocker cams is equally distributed to said rocker cams by an automatic adjustment of the parts while the clutch is in action. By an inspection of Fig. 1 it will be seen that the adjustment ring 11 is entirely contained within contiguous portions of the cover 2 which bears directly on the reciprocable sleeve and therefore provides a more rigid support for the clutch housing from the shaft 4.

I claim:—

In a friction clutch, the combination of a driving member, a driven member, a clutch pack arranged between the driving and driven members, a floating abutment arranged to operate upon said clutch pack, a clutch housing carried by one of said members, said clutch housing having a cover provided with an inwardly presented threaded boss, an adjusting ring having threaded connection with said threaded boss for axial adjustment with respect to said driving and driven members, said floating abutment and adjusting ring being provided with bearing surfaces permitting angular adjustment of said floating abutment with respect to the axis of said driving and driven members, an axially movable clutch operating member, and rocker cams arranged between said clutch pack and said floating abutment and operatably connected to said clutch operating member.

WILLIAM G. HAWLEY.